N. C. MOODY.
Gages for Gang-Saws.
No. 142,643.       Patented September 9, 1873.
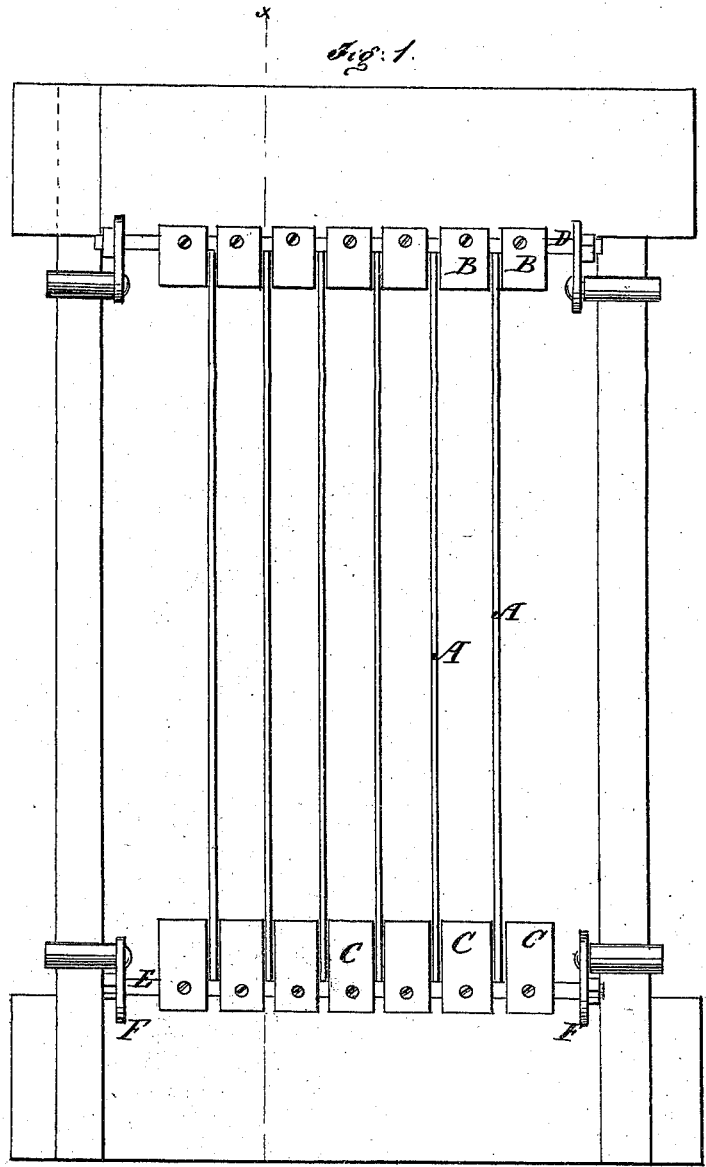
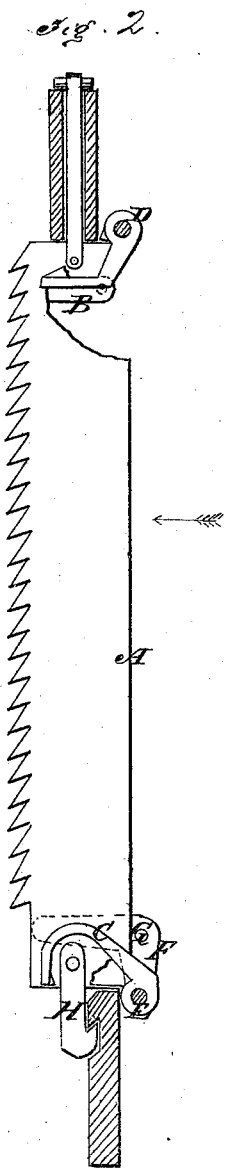
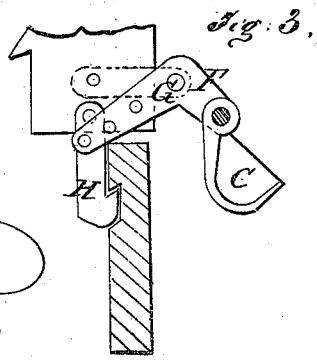
Witnesses.    Inventor.

UNITED STATES PATENT OFFICE.

NORMAN C. MOODY, OF MANISTEE, MICHIGAN.

IMPROVEMENT IN GAGES FOR GANG-SAWS.

Specification forming part of Letters Patent No. 142,643, dated September 9, 1873; application filed June 21, 1873.

*To all whom it may concern:*

Be it known that I, NORMAN C. MOODY, of Manistee, in the county of Manistee and State of Michigan, have invented a new and Improved Gang-Saw Gage, of which the following is a specification:

My invention consists in mounting the gage-blocks, used for gaging the distance of the saws of a gang of saws from each other, on a rod before or behind the saws, so that they can be readily swung into the spaces between the saws and out of them, and be put on and taken off without having to remove the saws.

Figure 1 is a rear elevation of a gang-saw gate with my improved arrangement of the gages; Fig. 2 is a sectional elevation of Fig. 1 on the line $x\ x$; and Fig. 3 is a section of the lower part of the gate, showing the gage-block swung back from between the saws.

A represents the saws, which may be hung at the ends, in the usual, or any approved way. B represents the gage-blocks for the upper end, and C the ones for the lower end, of the saw-gate. The upper rods are mounted on the rod D, and the lower ones on the rod E, and said blocks are so contrived that they may be introduced between the saws and removed without interfering with the devices by which the saws are hung; and they are mounted on the rods, and the rods are mounted so that they can be changed readily for others of different sizes, whenever it may be desired to change the gage of the saws, by removing the rods from their supports and taking off the blocks from the rods and putting on others.

The brackets F, in which the rod for the lower blocks is mounted, may be fixed on povots G, to swing forward and back or up and down, to facilitate the adjusting of the blocks C over the connecting-hooks H, and the sliding of the blocks on the rods along past the saws without being obstructed by them, and they have set-screws to hold them fast after gage-blocks are adjusted.

A very considerable saving in labor is effected by this contrivance in the removing and replacing of the saws necessary for filing them. They have to be removed about once in six hours.

Having thus described my invention, I claim as new and desire to secure by Letters Patent—

The arrangement of the gage-blocks B C of a gang of saws on rods D E, in the manner described, for changing them without disconnecting the saws, substantially as specified.

NORMAN C. MOODY.

Witnesses:
CHARLES N. KENNEDY,
T. B. COLLINS.